United States Patent Office 3,143,545
Patented Aug. 4, 1964

3,143,545
4-AMINOALKANOYL-2-PHENYL-3,4-DIHYDRO-2H-1,4-BENZOTHIAZINES
Harman S. Lowrie, Northbrook, Ill., assignor to G. D. Searle & Co., Chicago, Ill., a corporation of Delaware
No Drawing. Filed Nov. 27, 1961, Ser. No. 155,187
6 Claims. (Cl. 260—243)

The present invention describes a group of 4-aminoalkanoyl - 2 - phenyl-3,4-dihydro-2H-1,4-benzothiazines. More particularly, it relates to compounds of the formula

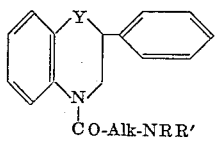

wherein Y is —S—

$$-\overset{|}{S}O, \text{ or } -\overset{|}{S}O_2$$

Alk is a lower alkylene radical and —NRR′ is an amino radical which may or may not be alkylated.

The lower alkylene radicals referred to above are bivalent saturated acyclic straight- or branched-chained hydrocarbon radicals containing up to 6 carbon atoms.

In the above general formula, —NRR′ includes both the unsubstituted amino radical, —NH$_2$, and amino radicals modified by introduction of one or two alkyl groups—especially lower alkyl groups. In addition, the above amino radical can refer to cyclic amino groups such as piperidino and piperazino. These cyclic amino radicals can be further substituted by hydroxy(lower alkyl) radicals. The lower alkyl radicals referred to above contain up to 6 carbon atoms and are typified by radicals such as methyl, ethyl, propyl, and isopropyl.

Equivalent to the basic amines of this invention for the purpose of this invention are their non-toxic acid addition salts and quaternary ammonium salts. Such salts are formed with a variety of inorganic and strong organic acids including sulfuric, phosphoric, hydrochloric, citric, maleic, and related acids. Quaternary ammonium salts are formed with a variety of organic esters of sulfuric, hydrohalic, and aromatic sulfonic acids. Among such esters are methyl chloride and bromide, ethyl chloride, propyl chloride, dimethyl sulfate, methyl benzenesulfonate, ethylene chlorohydrin, and allyl bromide.

The compounds of this invention are useful because of their valuable pharmacological properties. More particularly, these compounds possess a capacity to dull the appetite.

Various procedures are available for the preparation of the present compounds but a preferred procedure consists of contacting for as long as several hours at elevated temperatures and in an inert solvent a 4-haloalkanoyl-2-phenyl-3,4-dihydro-2H-1,4-benzothiazine of the formula

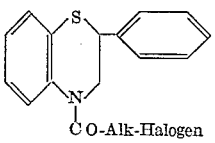

with an appropriate amine of the formula RR′NH where Alk and RR′N have the meanings indicated above. Suitable solvents for the reaction are ethanol, butanone, toluene, dimethylformamide, and the like.

The intermediate 4-haloalkanoyldihydrobenzothiazines referred to above can be conveniently prepared from 3-oxo-2-phenyl - 3,4 - dihydro-2H-1,4-benzothiazine. This benzothiazine is reduced with lithium aluminum hydride to give 2-phenyl-3,4-dihydro-2H-1,4-benzothiazine which is reacted with the appropriate haloalkanoyl halide in the presence of a tertiary amine to give the desired intermediate haloalkanoyldihydrobenzothiazines.

The sulfoxides and sulfones of the present invention can be prepared conveniently by oxidizing an alkanoyldihydrobenzothiazine with hydrogen peroxide and proceeding to the final product in the same manner as for the simple benzothiazines, or they can be prepared by oxidation of the 4-aminoalkanoyldihydrobenzothiazines to give the desired sulfone final products directly.

The compounds which constitute this invention and their preparation will appear more fully when a consideration of the following examples which are given for the purpose of illustration only and are not to be construed as limiting the invention in spirit or in scope. In these examples quantities are indicated in parts by weights, temperatures in degrees centigrade (° C.), and pressures in millimeters of mercury (mm.).

Example 1

By means of a continuous extractor, 123 parts of 3-oxo-2-phenyl-3,4-dihydro-2H-1,4-benzothiazine is extracted into a suspension of 40 parts of lithium aluminum hydride and 2800 parts of ether over a period of 3 days. Excess ethanol is added to decompose the excess lithium aluminum hydride. An excess of concentrated sodium hydroxide solution is added and the ether layer is separated, washed with water, and dried over anhydrous potassium carbonate. Evaporation of the solvent leaves a residue which is recrystallized from petroleum ether to give 2 - phenyl-3,4-dihydro-2H-1,4-benzothiazine melting at about 131.5–132.5° C.

Example 2

A solution of 85 parts of 3-chloropropionyl chloride in 140 parts of ether is added portionwise with stirring to a solution of 88 parts of 2-phenyl-3,4-dihydro-2H-1,4-benzothiazine and 55 parts of triethylamine in 1800 parts of ether. The suspension is stirred for 12 hours at room temperature and filtered. The filtrate is washed successively with water, dilute potassium hydroxide solution, water, dilute hydrochloric acid, and again with water. The ether solution is dried over anhydrous sodium sulfate and the solvent is evaporated to leave a solid residue which is 4-(3-chloropropionyl)-2-phenyl-3,4-dihydro-2H-1,4-benzothiazine.

If an equivalent quantity of chloroacetyl chloride is substituted for the 3-chloropropionyl chloride and the above procedure is repeated, the product is 4-chloroacetyl-2-phenyl - 3,4 - dihydro-2H-1,4-benzothiazine. This compound is obtained as a brown oil which is used without further purification.

Example 3

A mixture of 16 parts of 4-(3-chloropropionyl)-2-phenyl-3,4-dihydro-2H-1,4-benzothiazine, 10 parts of dimethylamine, 3 parts of sodium iodide, and 115 parts of toluene is heated in a sealed tube at 100° C. for 15 hours. The cooled reaction mixture is diluted with ether and the resultant solution is extracted with dilute hydrochloric acid. The acid extracts are washed with ether and alkalized and the alkaline mixture is extracted with ether. The ether solution is washed with water and dried and the solvent is evaporated to give 4-(3-dimethylaminopropionyl)-2-phenyl-3,4-dihydro-2H-1,4-benzothiazine as a brown oil. This compound has the following formula

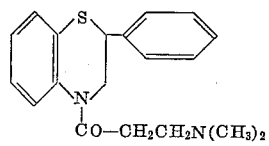

Example 4

Substitution of 16.2 parts of diethylamine for the 10 parts of dimethylamine called for in Example 3 affords, by the procedure there described, 4-(3-diethylaminopropionyl)-2-phenyl-3,4-dihydro-2H-1,4-benzothiazine. This compound has the following formula

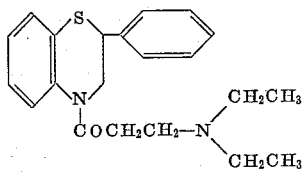

Example 5

A mixture of 9.1 parts of 4-chloroacetyl-2-phenyl-3,4-dihydro-2H-1,4-benzothiazine, 4.5 parts of dimethylamine, 2 parts of sodium iodide, and 72 parts of butanone is heated in a sealed tube at 60° C. for 15 hours. The cooled reaction mixture is filtered and the solvent is evaporated. The residue is dissolved in benzene and washed with dilute potassium hydroxide and with water and then extracted with dilute hydrochloric acid. The acid extracts are washed with ether and alkalized and the alkaline mixture is extracted with ether. The ether solution is washed with water and dried and the solvent is evaporated. The residue is crystallized from n-hexane to give 4-dimethylaminoacetyl-2-phenyl-3,4-dihydro-2H-1,4-benzothiazine melting at about 128–130° C. This compound has the following formula

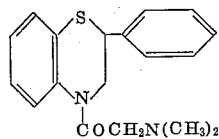

Example 6

A mixture of 16 parts of 4-(3-chloropropionyl)-2-phenyl-3,4-dihydro-2H-1,4-benzothiazine, 10 parts of 4-(3-hydroxypropyl)piperidine, 3 parts of sodium iodide and 7 parts of triethylamine in 320 parts of butanone is refluxed for 12 hours. The solvent is evaporated from the reaction mixture and a mixture of benzene and dilute potassium hydroxide solution is used to dissolve the residue. After separation from the aqueous layer, the benzene layer is washed with water and then extracted with dilute hydrochloric acid. The acidic extract is washed with ether and alkalized and the alkaline solution is extracted with chloroform. The chloroform solution is washed with water and dried over anhydrous potassium carbonate and the solvent is evaporated to leave a brown oil which is 4-{3-[4-(3-hydroxypropyl)piperidino]propionyl}-2-phenyl-3,4-dihydro-2H-1,4-benzothiazine. This compound has the following formula

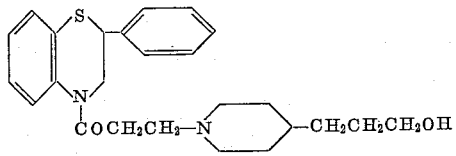

Example 7

If an equivalent quantity of 4-(2-hydroxyethyl)piperidine is substituted for the 4-(3-hydroxypropyl)piperidine and the procedure of Example 6 is repeated, the product is 4-{3-[4-(2-hydroxyethyl)piperidino]-propionyl}-2-phenyl-3,4-dihydro-2H-1,4-benzothiazine melting at about 103–106° C. after recrystallization from a mixture of benzene and n-heptane.

Example 8

A mixture of 16 parts of 4-(3-chloropropionyl)-3-phenyl-3,4-dihydro-2H-1,4-benzothiazine, 8 parts of 3-hydroxymethylpiperidine, 3 parts of sodium iodide and 7 parts of triethylamine in 320 parts of butanone is refluxed for 12 hours. Isolation of the product is carried out by the procedure detailed in Example 6 to give 4-[3-(3-hydroxymethylpiperidino)propionyl]-2-phenyl-3,4-dihydro-2H-1,4-benzothiazine. This compound has the following formula

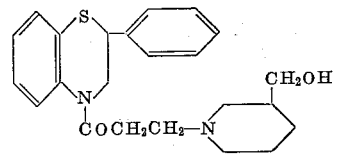

Example 9

A mixture of 22.3 parts of 4-(3-chloropropionyl)-2-phenyl-3,4-dihydro-2H-1,4-benzothiazine, 18 parts of 1-(β-hydroxyethyl)piperazine, and 3 parts of sodium iodide in 320 parts of butanone is refluxed for 12 hours. The reaction mixture is evaporated to dryness under reduced pressure and the residue is dissolved in chloroform. The chloroform solution is washed with dilute potassium hydroxide and then with water and extracted with dilute hydrochloric acid. The acidic extract is washed with ether, alkalized, and extracted with chloroform and the chloroform extract in turn is washed with water and dried over anhydrous potassium carbonate. Evaporation of the solvent leaves a brown oil. A hot ethanolic solution of the oil is mixed with a hot ethanolic solution of maleic acid to give, on cooling, the maleic acid salt of 4-{3-[4-(2-hydroxyethyl)-piperazino]propionyl}-2-phenyl-3,4-dihydro-2H-1,4-benzothiazine. This salt contains two moles of maleic acid and melts at 139–141° C. The free base of this compound has the following formula

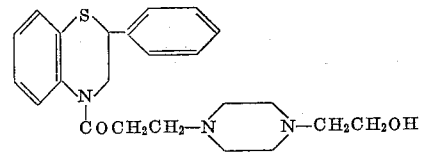

Example 10

Using the technique of Example 9, 22.3 parts of 4-(3-chloropropionyl)-2-phenyl-3,4-dihydro-2H-1,4-benzothiazine, 20 parts of 1-(3-hydroxypropyl)piperazine, and 3 parts of sodium iodide in 320 parts of butanone are reacted together to give, as the final product, the maleic acid salt of 4-{3-[4-(3-hydroxypropyl)-piperazino]propionyl}-2-phenyl-3,4-dihydro-2H-1,4-benzothiazine. The free base of this compound has the following formula

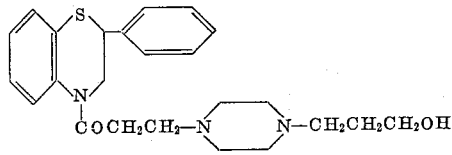

Example 11

An equivalent quantity of piperidine is substituted for the 1-(2-hydroxyethyl)piperazine and the procedure of Example 9 is repeated. To isolate the product, the crude reaction mixture is filtered and the solvent is evaporated from the filtrate under reduced pressure. The residue is dissolved in benzene and the benzene solution is washed successively with potassium hydroxide and with water and then extracted with dilute hydrochloric acid. The acid extracts are washed with water, alkalized, and extracted with benzene and the benzene extracts are washed with water and dried, and the solvent is evaporated. The residue is crystallized from n-heptane to give 4-(3-piperidinopropionyl) - 2 - phenyl-3,4-dihydro-2H-1,4-benzothiazine melting at about 132–135° C.

Example 12

A mixture of 9.1 parts of 4-chloroacetyl-2-phenyl-3,4-dihydro-2H-1,4-benzothiazine, 10 parts of piperidine, 2 parts of sodium iodide, and 320 parts of butanone is refluxed for 12 hours. Isolation of the product from the reaction mixture is carried out as in Example 11. Crystallization of the product from n-hexane gives 4-piperidinoacetyl-2-phenyl-3,4-dihydro-2H-1,4 - benzothiazine melting at about 106–108° C.

Example 13

A mixture of 5 parts of 4 - {3-[4-(2-hydroxyethyl)piperidino]propionyl} - 2 - phenyl-3,4-dihydro-2H - 1,4-benzothiazine, 5 milliliters of 30% hydrogen peroxide, and 52 parts of glacial acetic acid is heated on a steam bath for 4 hours and then allowed to stand at room temperature for 15 hours. The solution is diluted with water and made alkaline with dilute potassium hydroxide solution. The resultant mixture is extracted with chloroform and the chloroform extracts are washed with water and dried and the solvent is removed under reduced pressure. The residue is dissolved in acetone and an excess of hydrogen chloride dissolved in 2-propanol is added. The resultant mixture is diluted with ether and the oily hydrochloride which separates is crystallized from a mixture of methanol and butanone to give 4 - {3-[4-(2-hydroxyethyl)piperidino]propionyl}-2-phenyl - 3,4 - dihydro-2H-1,4-benzothiazine - 1,1 - dioxide hydrochloride melting at about 218–220° C. This compound has the following formula

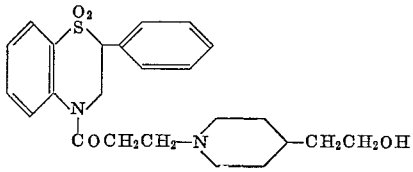

What is claimed is:
1. A compound of the formula

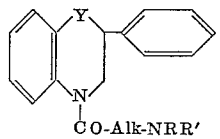

wherein Y is selected from the group consisting of

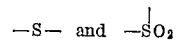

Alk is lower alkylene; and —NRR' is selected from the group consisting of di(lower alkyl)-amino, piperidino, monohydroxy(lower alkyl)piperidino, and monohydroxy (lower alkyl)piperazino.

2. A compound of the formula

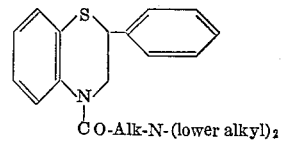

wherein Alk is lower alkylene.

3. 4 - dimethylaminoacetyl-2-phenyl-3,4-dihydro-2H-1,4-benzothiazine.

4. 4-(3-dimethylaminopropionyl) - 2 - phenyl - 3,4-dihydro-2H-1,4-benzothiazine.

5. A compound of the formula

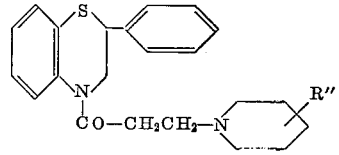

wherein R'' is monohydroxy lower alkyl.

6. 4 - {3-[4-(3-hydroxypropyl)piperidino]propionyl}-2-phenyl-3,4-dihydro-2H-1,4-benzothiazine.

References Cited in the file of this patent

UNITED STATES PATENTS

| | | |
|---|---|---|
| 2,364,347 | Dickey et al. | Dec. 5, 1944 |
| 2,381,935 | Strain et al. | Aug. 14, 1945 |
| 2,947,744 | Lowrie | Aug. 2, 1960 |
| 2,963,476 | De Stevens | Dec. 6, 1960 |

OTHER REFERENCES

Kerwin et al.: Jour. Organic Chemistry, vol. 24, pp. 1719, 1959.